(12) United States Patent
Sakai

(10) Patent No.: US 9,493,076 B2
(45) Date of Patent: Nov. 15, 2016

(54) ROTATING ELECTRIC MACHINE CONTROL SYSTEM

(71) Applicant: DENSO CORPORATION, Kariya, Aichi-pref. (JP)

(72) Inventor: Naoto Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 29 days.

(21) Appl. No.: 14/708,352

(22) Filed: May 11, 2015

(65) Prior Publication Data

US 2015/0333671 A1    Nov. 19, 2015

(30) Foreign Application Priority Data

May 14, 2014    (JP) ................................. 2014-100671

(51) Int. Cl.
*H02P 6/14*   (2016.01)
*B60L 11/00*  (2006.01)
*H04L 1/00*   (2006.01)

(52) U.S. Cl.
CPC ................ *B60L 11/00* (2013.01); *H02P 6/142* (2013.01); *H04L 1/00* (2013.01)

(58) Field of Classification Search
CPC B60L 2210/40; B60L 11/14; B60L 2240/80; B60L 3/0061; B60L 3/0084; B60L 11/126; B60L 11/1803; B60L 11/1861; B60L 11/1864; B60L 11/1887; B60L 2210/10; B60L 2240/36; B60L 2240/421
USPC ............ 318/400.02, 400.04, 400.13, 400.21, 318/473; 701/22
See application file for complete search history.

(56) References Cited

U.S. PATENT DOCUMENTS 4,449,087 A * 5/1984 Lippitt .................. H02P 25/024
                                                   318/721
5,398,238 A * 3/1995 Inagawa ............. G06F 13/4027
                                                   340/4.2

(Continued)

FOREIGN PATENT DOCUMENTS

JP    2001-103799 A    4/2001
JP    2002-345256 A    11/2002

(Continued)

OTHER PUBLICATIONS

U.S. Appl. No. 14/708,351, filed May 11, 2015, Denso Corporation.

*Primary Examiner* — Paul Ip
(74) *Attorney, Agent, or Firm* — Posz Law Group, PLC

(57) ABSTRACT

A rotating electric machine control system having a power control unit equipped with a voltage converter and a controller. The controller is equipped with an operation unit having a time corrector for obtaining time from first and second timers with reference to an ignition signal and correcting a relative time difference between the timers. The operation unit obtains electric angles at a preset cycle after correcting time. A communicator obtains electric currents and voltages when obtaining the electric angles for generating a communication frame, and outputs the communication frame to the operation unit via the multiplex communication line. The operation unit simultaneously performs an operation for controlling an inverter and a booster converter based on the obtained electric currents, the voltages, and the electric angles, for reducing the number of communication lines between the power control unit and the controller without compromising controllability of the voltage converter.

6 Claims, 11 Drawing Sheets

(56) References Cited

U.S. PATENT DOCUMENTS

| | | | | |
|---|---|---|---|---|
| 2005/0263121 A1* | 12/2005 | Tamagawa | ............... | F02N 11/08 123/179.3 |
| 2012/0062158 A1* | 3/2012 | Itou | ..................... | H02P 23/0077 318/400.21 |
| 2012/0065823 A1* | 3/2012 | Taguchi | ................ | B60L 3/0061 701/22 |
| 2012/0139460 A1* | 6/2012 | Senkou | ............... | H02P 21/0096 318/400.02 |
| 2012/0326650 A1* | 12/2012 | Ito | ....................... | H02P 29/0044 318/473 |
| 2012/0330485 A1* | 12/2012 | Tamagawa | ............... | B60K 6/46 701/22 |
| 2013/0038342 A1* | 2/2013 | Nozaki | ................. | B60L 3/0038 324/750.3 |

FOREIGN PATENT DOCUMENTS

| | | |
|---|---|---|
| JP | 2012-016110 A | 1/2012 |
| JP | 2013-001185 A | 1/2013 |
| JP | 2013-258843 A | 12/2013 |

\* cited by examiner

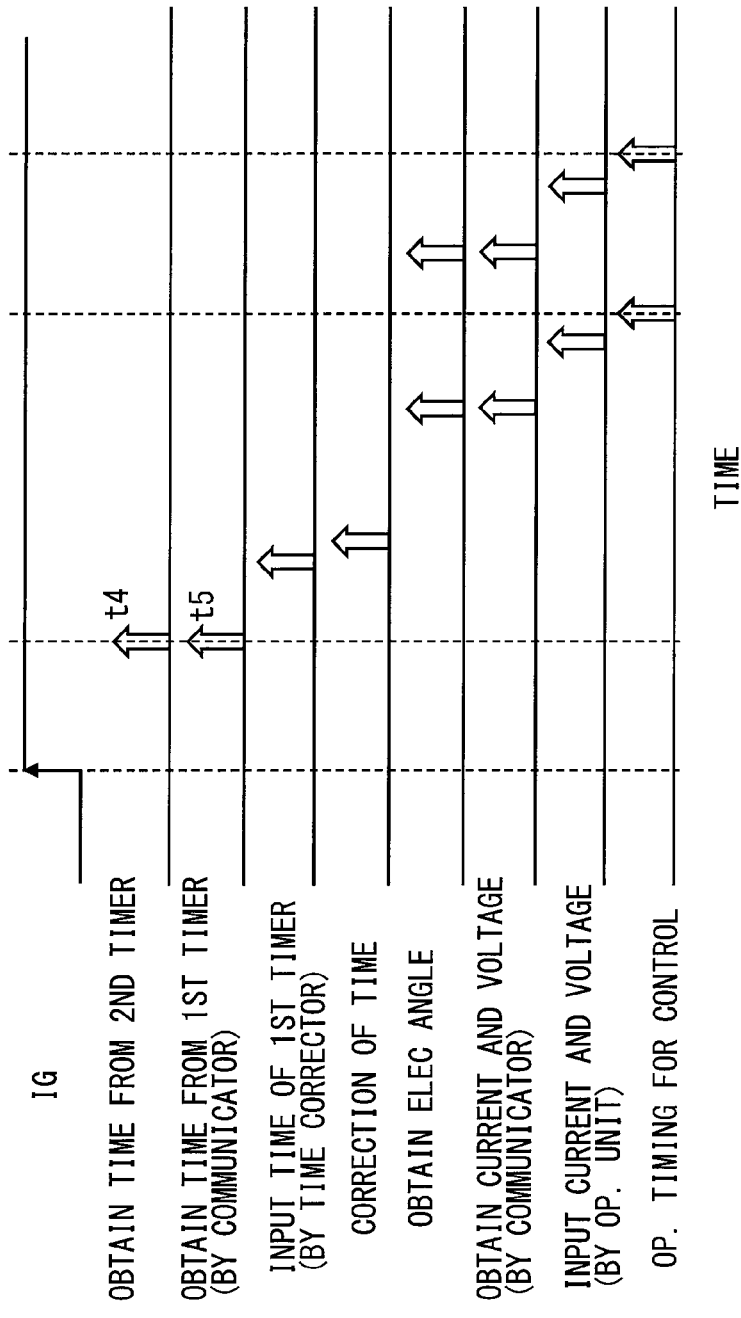

ROTATING ELECTRIC MACHINE CONTROL SYSTEM

CROSS REFERENCE TO RELATED APPLICATION

The present application is based on and claims the benefit of priority of Japanese Patent Application No. 2014-100671, filed on May 14, 2014, the disclosure of which is incorporated herein by reference.

TECHNICAL FIELD

The present disclosure generally relates to a rotating electric machine control system for controlling rotating electric machines in a vehicle.

BACKGROUND INFORMATION

Conventionally, within the art of rotating electric machines, a rotating electric machine control system used in a vehicle is known, with which at least one of rotating electric machines in a vehicle for providing a power for a travel of the vehicle is controlled.

For example, a patent document 1 (i.e., Japanese Patent No. JP-A-2013-1185) discloses a rotating electric machine control system having a voltage converter for converting a direct current voltage of a direct current power source and outputting a converted three-phase alternating current to the rotating electric machine, and a controller has an operation unit for performing a preset operation that controls the voltage converter to output a requested torque from the rotating electric machine.

The rotating electric machine controller apparatus described above further includes a current detector that detects an electric current output from the voltage converter to the rotating electric machine in each of three phases, a voltage detector that detects the direct current voltage supplied from the direct current power source, and a rotation detector that detects a rotation position of the rotating electric machine. The control section controls the voltage converter based on detection signals from each of those detectors.

However, in view of installability of the rotating electric machine controller apparatus within a vehicle, when considering a functionality distribution consideration and a manufacturing cost, the voltage converter and the control section in the rotating electric machine controller apparatus may be provided as two separate components, rather than one. More practically and precisely, a power control unit having the voltage converter and a control section may be separated from each other. Further, the rotation detector may also be separately provided apart from the power control unit, to be close to the rotating electric machine.

On the other hand, the current detector detects the electric current that is output from the voltage converter to the rotating electric machine in each of the three phases. When the voltage converter includes a booster converter, the current detector also detects the electric current flowing in a reactor. Therefore, the current detector is arranged to be proximate to the voltage converter.

Further, the voltage detector detects the direct current voltage supplied from the direct current power source. When the booster converter is included in the voltage converter, the voltage detector also detects the direct current voltage after the boosting. Therefore, the voltage detector is also arranged to be proximate to the voltage converter.

Thus, the current detector and the voltage detector constitute the power control unit together with the voltage converter. Therefore, the number of communication lines (i.e., wire harness) connecting the power control unit and the controller increases dramatically. The increase of the number of communication lines means an increase of the manufacturing cost. Further, when the controller is disposed in a vehicle compartment and the power control unit is disposed in an engine room, the communication lines connecting the two components have to pass through a dividing wall between the vehicle compartment and the engine room, i.e., pass through a small hole on the dividing wall, which has, usually, a very small dimension/diameter, for the quietness of the compartment side and the rigidity of the vehicle body. That is, the number of communication lines must be limited under a certain number for the above-described restrictions.

For the resolution of the above problem, a communication frame including two or more detection values (i.e., detected current values or detected voltage values) from the current detector and the voltage detector may be generated, and such a communication frame may be transmitted via the multiplex communication line, for reducing the number of communication lines. This multiplex communication line is used for communications according to a CAN-FD (Controller Area Network Flexible Data Rate) protocol or similar communications (CAN is a registered trademark). In such case, the power control unit further includes a communication device, which generates and outputs a communication frame.

However, the delay of communication caused by a transmission via the multiplex communication line will make it difficult to time-synchronize (a) the detection values from the current/voltage detectors with (b) the detection value from the rotation detector. In other words, the controllability of the voltage converter may be deteriorated.

SUMMARY

It is an object of the present disclosure to provide a rotating electric machine control system, in which a power control unit (PCU) that includes and separately provides a voltage converter and a controller, for reducing the number of communication lines between the PCU and the controller without deteriorating the controllability of the voltage converter.

The following description provides a technical solution for achieving the above-described goal. The parenthesized numbers in the following description and in the claims merely indicate relationships of the described components to concrete objects in the embodiments, thereby not limiting the disclosure in any sense. Further, the embodiments may be arbitrarily combined as a whole or in part, unless otherwise indicated.

In an aspect of the present disclosure, the rotating electric machine control system is disposed in a vehicle and controlling rotating electric machines, at least one of the rotating electric machines used as a power source for a travel of the vehicle. The rotating electric machine control system includes a power control unit with a voltage converter that converts a direct current voltage from a direct current power source and outputting a converted three-phase alternating current to the at least one rotating electric machine, a current detector that detects an electric current, as a detected current value, that is output from the voltage converter to the at least one rotating electric machine in each of three phases, a voltage detector that detects the direct current voltage, as a detected voltage value, a communicator that generates and outputs a communication frame, and a first timer and a second timer each measuring time. The rotating electric machine control system also includes a controller that has an operation unit that performs a preset operation for a control of the voltage converter to output the converted three-phase alternating current to the at least one rotating electric machine which outputs a requested torque from the at least one rotating electric machine, and a time corrector correcting a relative time difference between time measured by the second timer and time measured by the first timer, a multiplex communication line that communicably connects the power control unit and the controller, the communication frame being transmitted from the communicator to the controller, and a rotation detector that detects a rotation position of the at least one rotating electric machine and outputting the rotation position to the controller via a line other than the multiplex communication line. The time corrector performs a time correction which corrects the relative time difference between the first timer and the second timer by obtaining time measurements from the first and second timers at a preset timing, with reference to an input signal that is commonly input to both of the power control unit and the controller. After the time correction by the time corrector, the operation unit obtains at a preset cycle the rotation position that is detected by the rotation detector, and, when the operation unit is obtaining the rotation position, the communicator obtains a plurality of detected current values from the current detector and a plurality of detected voltage values from the voltage detector to generate the communication frame, and outputs the communication frame to the operation unit via the multiplex communication line. The operation unit performs the preset operation based on the rotation position, the detected current value, and the detected voltage value. The rotation position, the detected current value, and the detected voltage value are detected substantially simultaneously.

According to the above, the communicator in the power control unit generates a communication frame that includes plural values that are detected by the current detector and the voltage detector. Further, the generated communication frame is output to the operation unit of the controller via the multiplex communication line. That is, the plural values are transmitted to the operation unit of the controller via the same multiplex communication line in a sharing manner, i.e., sharing the same communication line. Therefore, the number of communication lines between the power control unit and the controller is reduced.

Further, the time corrector in the controller corrects the relative time difference, i.e., time error, between the first timer and second timer by obtaining the time measurements from the first and second timers at a "same" preset timing, with reference to an input of an input signal that is commonly input to both of the power control unit and the controller.

In such manner, synchronization between (i) the timing of obtaining the rotation position, which is detected by the rotation detector, by the operation unit and (ii) the timing of obtaining the detection values (i.e., detected current values or detected voltage values), which are detected by the current/voltage detectors, by the communicator is achieved, for the generation of the communication frame. That is, the operation unit can perform the preset operation based on the rotation position, detected current values, and detected voltage values that are obtained at the same time (i.e., simultaneously) from respective detectors, thereby preventing a deterioration of the controllability of the voltage converter.

BRIEF DESCRIPTION OF THE FIGURES

Objects, features, and advantages of the present disclosure will become more apparent from the following detailed description made with reference to the accompanying drawings, in which:

FIG. 13 is a time chart of an operational effect of the MG control system of the present disclosure.

DETAILED DESCRIPTION

Hereafter, the embodiment of the present disclosure is described with reference to the drawings, wherein like numbers show like parts in each of the embodiments described below.

First Embodiment

In the first embodiment, an application of an MG control system to a split-type hybrid vehicle is described.

Figure 1:
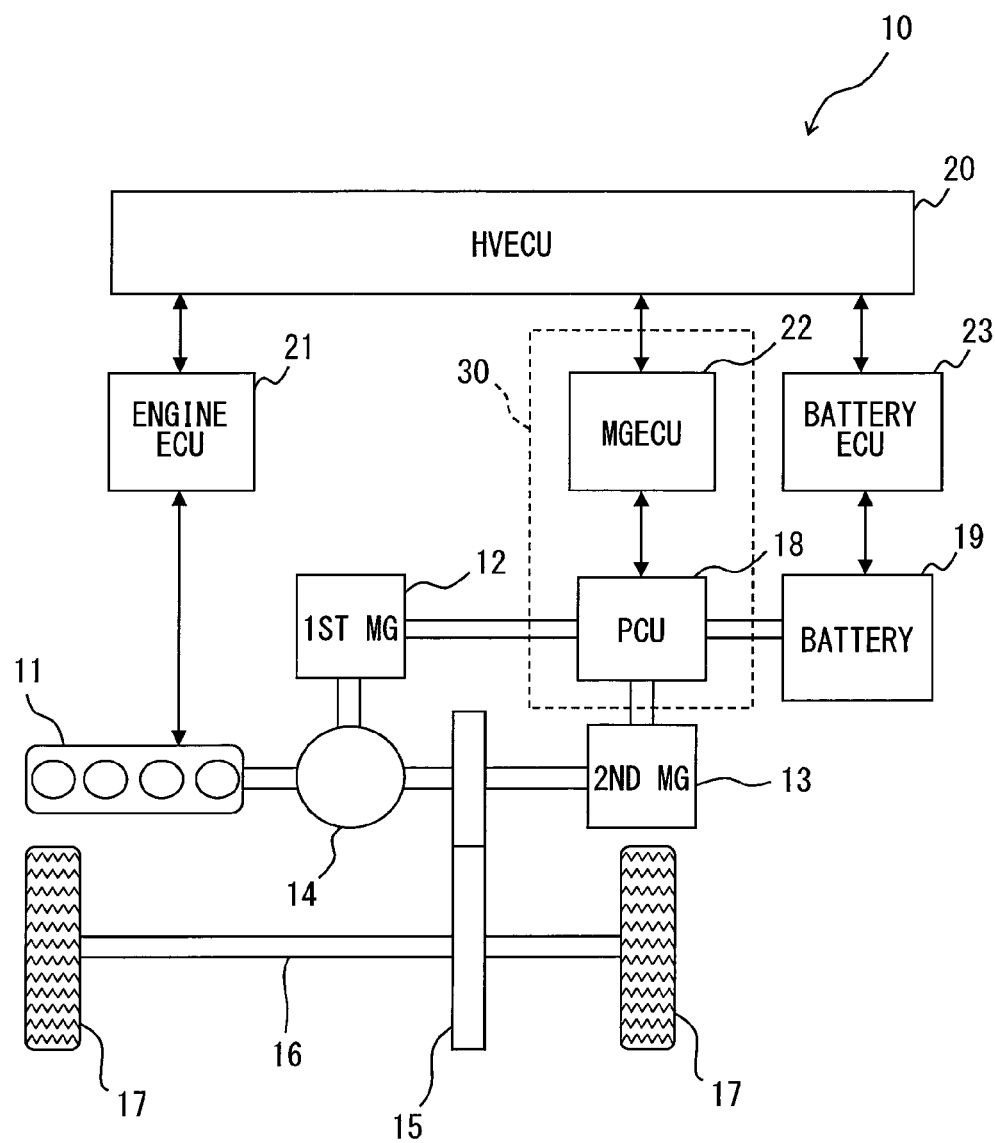
FIG. 1 is a block diagram of a hybrid vehicle of the present disclosure.

First, an outline configuration of a hybrid vehicle is described based on FIG. 1

As shown in FIG. 1, a hybrid vehicle 10 is provided with an engine 11 which is an internal-combustion engine, a first motor-generator 12, and a second motor-generator 13. The motor-generator may also be designated as the MG, which means that the MG 12 or the first MG 12 represents the first motor-generator 12. Further, the MG 13 or the second MG 13 represents the second motor-generator 13. These MGs 12 and 13 are equivalent to a rotating electric machine in the claims.

The MGs 12 and 13 are respectively constituted as a synchronous generator-motor, which has the rotor having a permanent magnet attached thereon, and the stator having three phase windings wound thereon. The first MG 12 generates electricity by receiving a driving force from outside thereof, and serves as a starter for starting the engine 11. The engine 11, the first MG 12 and second MG 13 are mutually connected via a power splitter 14.

The power splitter 14 serves as a gearbox for distributing a driving force of the engine 11 among the first MG 12 and a speed reduction gear 15, as well as serving as a transmission.

The hybrid vehicle 10 travels on the driving force at least from one of the engine 11 and the second MG 13, depending on a situation. In other words, the engine 11 and the second MG 13 respectively serve as a power source for a travel of the hybrid vehicle 10.

The speed reduction gear 15 transmits the power generated by the engine 11, the first MG 12 and the second MG 13 to a drive wheel 17 via a drive shaft 16, or transmits the driving force from the drive wheel 17 (back) to the engine 11, the first MG 12 and the second MG 13.

The hybrid vehicle 10 is further provided with a power control unit 18 (i.e., a PCU 18) and a battery 19. The battery 19 is a chargeable and dischargeable direct current power source, for example, and consists of rechargeable batteries, e.g. nickel hydride batteries and/or lithium ion batteries. Hereafter, the power control unit 18 may be designated as the PCU 18.

The PCU 18 is connected to the first MG 12, the second MG 13, and the battery 19. The PCU 18 includes an inverter and a booster converter, details of which are described later. The inverter performs a current control, converting a direct current of the battery 19 to/from an alternating current of each of the MGs 12 and 13.

On the other hand, the booster converter boosts the voltage of the battery 19 to a high voltage for supplying the boosted voltage to the inverter, and downs the high voltage of the inverter for the charging of the battery 19.

Therefore, the electric power generated by the first MG 12 is supplied to the second MG 13 via the inverter of the PCU 18, and the same electric power can also be charged to the battery 19 via the inverter and the booster converter of the PCU 18.

Further, the electric power generated by the MGs 12 and 13 can also be charged to the battery 19 via the PCU 18.

Still further, the electric power charged in the battery 19 can also be supplied to the second MG 13 via the PCU 18.

In addition, the hybrid vehicle 10 is provided with an HVECU 20, an engine ECU 21 and an MGECU 22, and a battery ECU 23. The MGECU 22 is equivalent to a controller in the claims.

Each of the ECUs 20-23 are constituted, for example, to include a so-called microcomputer that consists of CPU, ROM, RAM, a register, I/O, etc., for example. The CPU performs signal processing according to a signal and a program, i.e., the signal obtained via I/O and the program stored in the ROM with the help of RAM, the registers and the like. Further, the processed signal from the signal processing is output via I/O. Thereby, each of the ECUs 20-23 can perform various functions. In each of the ECUs 20-23, an IC may be provided in addition to the microcomputer.

The HVECU 20 manages the engine ECU 21, the MGECU 22, and the battery ECU 23 in a cooperative manner, and controls an entire drive system of the hybrid vehicle 10 for an optimal and efficient operation of the hybrid vehicle 10. The HVECU 20 calculates a driving force of the vehicle 10 based on a driver's operation of the vehicle 10 (e.g., an accelerator opening), a travel speed, etc., and determines a distribution of a requested power among the engine 11 and the MGs 12 and 13 according to the travel state of the hybrid vehicle 10.

The engine ECU 21 controls an operation state of the engine 11. More practically, for drawing/generating a requested power from the engine 11, the ECU 21 controls a throttle valve, which is not illustrated, to have a suitable opening, and also controls a fuel injection amount and an ignition timing of the engine 11. The engine ECU 21 controls the drive of the engine 11 according to a control signal from the HVECU 20. Further, as required, data about the driving state of the engine 11 is output from the engine ECU 21 to the HVECU 20.

The MGECU 22 controls the MGs 12 and 13 according to the state of the hybrid vehicle 10. More practically, by outputting a control signal to the PCU 18, the MGECU 22 controls the MGs 12 and 13. The MGECU 22 controls the drive of the MGs 12 and 13 according to the control signal from the HVECU 20. Further, as required, data about the driving state of the MGs 12 and 13 is output to the HVECU 20.

The battery ECU 23 controls a charge-and-discharge state of the battery 19 while monitoring a charge state of the battery 19. The battery ECU 23 receives an input of a signal for a management of the battery 19, e.g., a signal representing an inter-terminal voltage of the battery 19, charge and discharge electric currents, battery temperature, and the like. The battery ECU 23 outputs data about the state of the battery 19 to the HVECU 20 as required.

Figure 2:
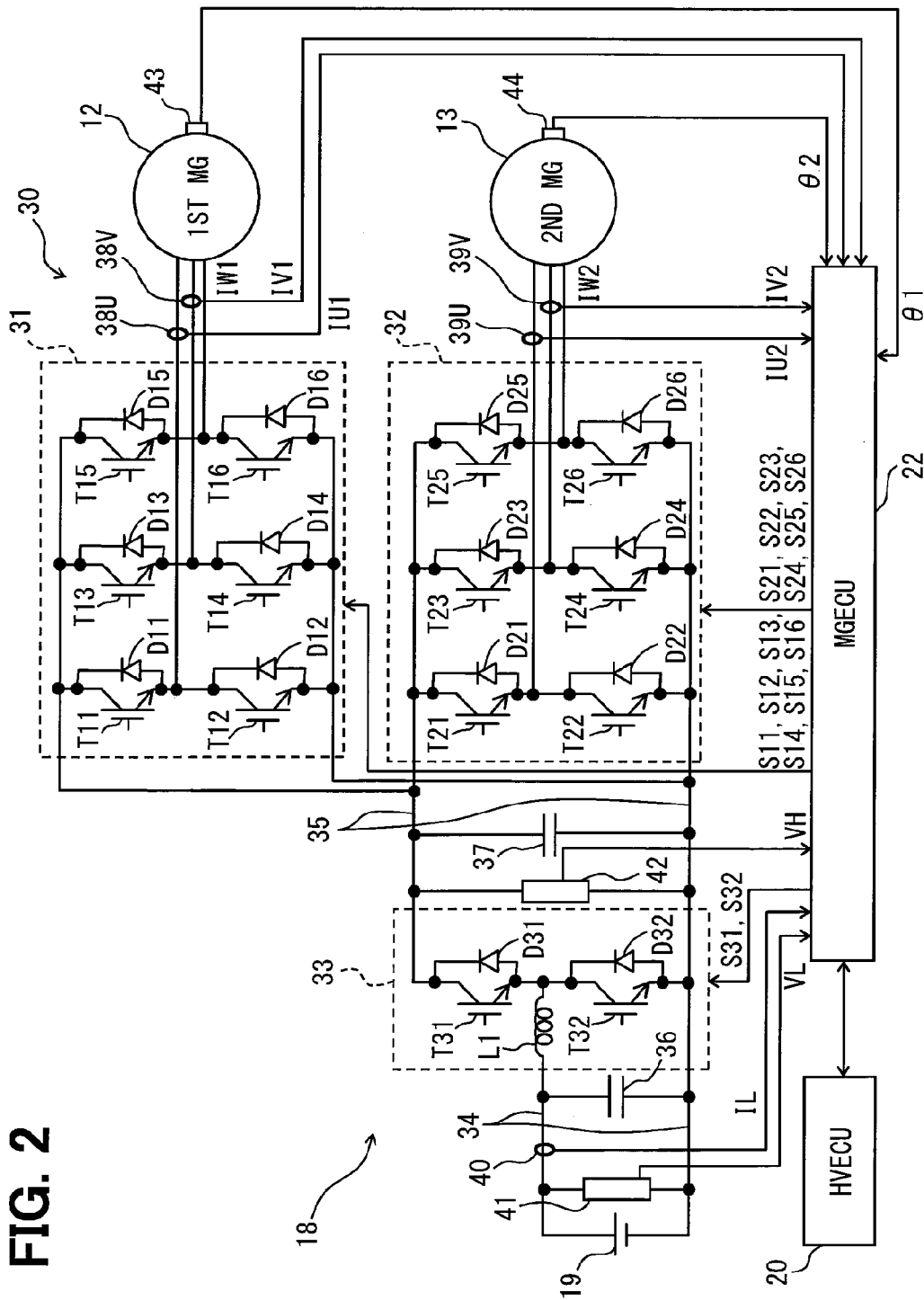
FIG. 2 is a schematic diagram of an MG control system used in the hybrid vehicle of FIG. 1.
Figure 3:
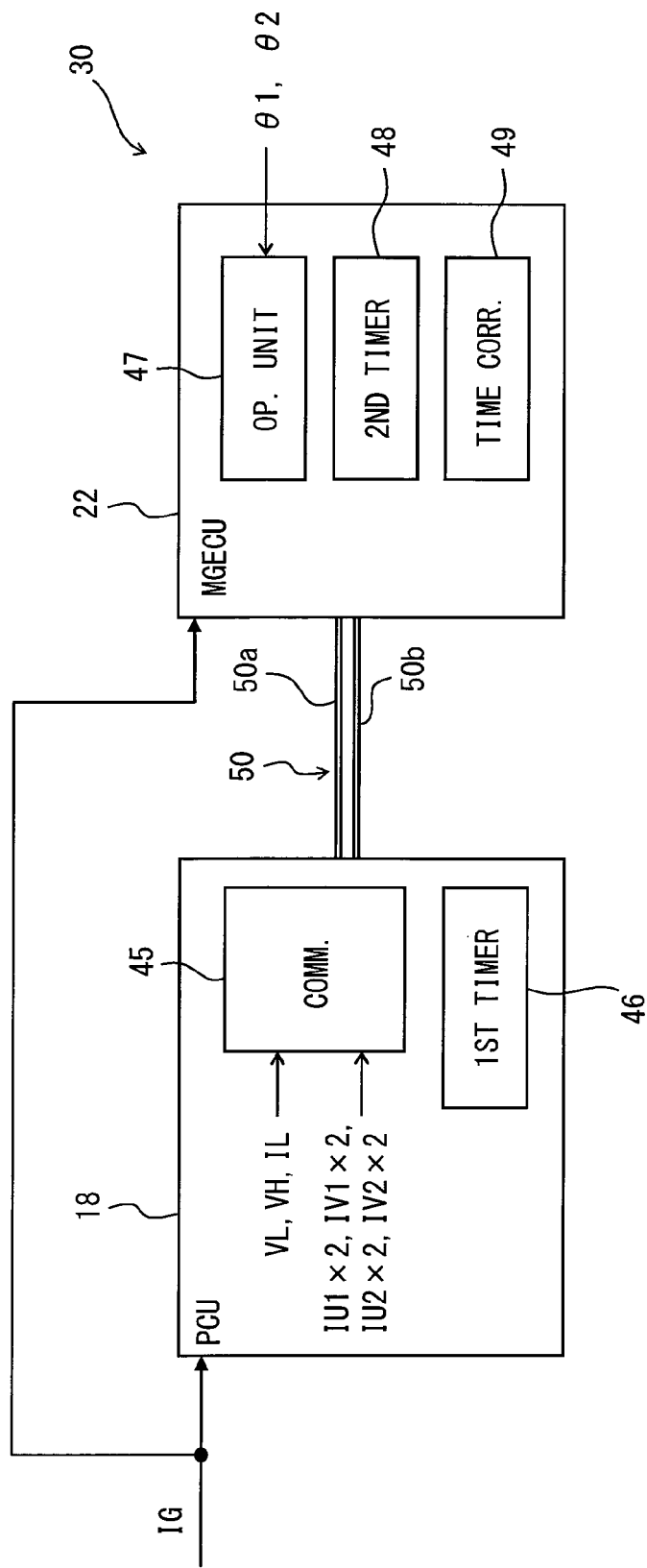
FIG. 3 is a block diagram of the MG control system of the present disclosure.

Next, based on FIGS. 2 and 3, an MG control system 30 applied to the above-mentioned hybrid vehicle 10 is described. The MG control system 30 is equivalent to a rotating electric machine control system in the claims.

As shown in FIG. 2, the MG control system 30 is provided with the PCU 18 and the MGECU 22. The PCU 18 has two inverters 31 and 32 which drive the MGs 12 and 13, and a booster converter 33. The booster converter 33 converts a voltage between a low-voltage power line 34 connected to the battery 19 and a high-voltage power line 35 connected to the inverters 31 and 32. The inverters 31 and 32 and the booster converter 33 are equivalent to a voltage converter in the claims.

The inverter 31 has transistors T11-T16 and diodes D11-D16, among which the transistors T11-T16 are in series connection between the plus and the minus sides of the high-voltage power line 35, two transistors in respective series, and the diodes D11-D16 are in reverse-parallel connection with each of those transistors T11-T16, for forming an "upper arm" and a "lower arm" for each of three phases.

Further, to a connection point of a U phase arm between transistors T11 and T12, a U phase coil of the first MG 12 is connected. Similarly, to a connection point of a V phase arm between transistors T13 and T14, a V phase coil of the first MG 12 is connected, and to a connection point of a W phase arm between transistors T15 and T16, a W phase coil of the first MG 12 is connected.

The inverter 32 has transistors T21-T26 and diodes D21-D26, among which the transistors T21-T26 are in series connection between the plus and the minus sides of the high-voltage power line 35, two transistors in respective series, and the diodes D21-D26 are in reverse-parallel connection with each of those transistors T21-T26, for forming an "upper arm" and a "lower arm" for each of three phases.

Further, to a connection point of a U phase arm between transistors T21 and T22, a U phase coil of the second MG 13 is connected. Similarly, to a connection point of a V phase arm between transistors T23 and T24, a V phase coil of the second MG 13 is connected, and to a connection point of a W phase arm between transistors T25 and T26, a W phase coil of the second MG 13 is connected.

As the transistors T11-T16 and T21-T26, "power transistors" such as IGBT, MOSFET, etc., may be employable.

The booster converter 33 includes a transistor T31 connected to a plus side of the high voltage power line 35 and a transistor T32 connected to a minus side of the high voltage power line 35, together with diodes D31, 32, respectively connected reverse-parallel to the transistors T31, 32.

In addition, the booster converter 33 has a reactor L1 connected to plus terminal side of the low-voltage power line 34 while being connected to a junction point between the transistor T31 and the transistor T32.

As the transistor T31 and T32, "power transistors" such as IGBT, MOSFET, etc. may be employable.

In addition, the PCU 18 includes smoothing capacitors 36 and 37, current sensors 38U, 38V, 39U, 39V, and 40, and voltage sensors 41 and 42.

These current sensors 38U, 38V, 39U, 39V, and 40 are equivalent to a current detector in the claims, and the voltage sensors 41 and 42 are equivalent to a voltage detector in the claims.

The smoothing capacitor 36 is disposed at a position between the plus side and the minus side of the low-voltage power line 34, and is connected in parallel with the battery 19.

The smoothing capacitor 37 is disposed at a position between the plus side and the minus side of the high-voltage power line 35, and is connected in parallel with the inverters 31 and 32.

The current sensor 38U detects an electric current IU1 which flows into the U phase coil among the three phases of the first MG 12 (i.e., detects an actual current value), and the current sensor 38V detects an electric current IV1 which flows into the V phase coil.

Similarly, the current sensor 39U detects an electric current IU2 which flows into the U phase coil among the three phases of the second MG 13 (i.e., detects an actual current value), and the current sensor 39V detects an electric current IV2 which flows into the V phase coil.

The current sensor 40 detects an electric current IL which flows into the reactor L1, i.e., detects the charge and discharge currents.

The voltage sensor 41 is attached at a position between the terminals of the battery 19, and detects a battery voltage, i.e., a before-boost voltage VL. On the other hand, the voltage sensor 42 is attached at a position between the terminals of the smoothing capacitor 37, and detects a direct current voltage of the high-voltage power line 35, i.e., an after-boost voltage VH.

In addition, the MG control system 30 is provided with rotation angle sensors 43 and 44 independently/separately from the PCU 18 and the MGECU 22. The rotation angle sensors 43 and 44 are used to detect an absolute value of a rotation position (i.e., a magnetic pole position) of each of the MGs 12 and 13.

The rotation angle sensor 43 detects a rotation position (i.e., an electric angle θ1) of the first MG 12 by a specific unit angle, and the rotation angle sensor 44 detects a rotation position (i.e., an electric angle θ2) of the second MG 13 at a specific unit angle. The rotation angle sensors 43 and 44 are equivalent to a rotation detector in the claims.

The PCU 18 includes a communicator 45 and a first timer 46 as shown in FIG. 3, in addition to the above-described inverters 31, 32, the booster convertor 33, and respective sensors 38UN, 39UN, 40-42. On the other hand, the MGECU 22 includes an operation unit 47, a second timer 48, and a time corrector 49. Further, the MG control system 30 has a multiplex communication line 50 for connecting the PCU 18 and the MGECU 22. In the above, the communicator 45 corresponds to a communicator in the claims, the first timer 46 corresponds to a first timer in the claims, the operation unit 47 corresponds to an operation unit in the claims, the second timer 48 corresponds to a second timer in the claims, and the time corrector 49 corresponds to a time corrector in the claims.

The communicator 45 generates a communication frame containing the plurality of the values detected by the current sensors 38U, 38V, 39U, 39V, and 40 and the voltage sensors 41 and 42. The generated communication frame is output from the communicator 45 to the MGECU 22 via the multiplex communication line 46. The communicator 45 providing an above-described function may be implemented as a microcomputer, or may be implemented as ICs, e.g., ASIC, for example.

The types of the communication frame generated by the communicator 45 are not specifically limited to a certain type. That is, only one type frame may be generated, or plural type frames may be generated by the communicator 45. The communication frame is configured to be transmitted from the communicator 45 to the operation unit 47 during an operation cycle for performing an operation by the operation unit 47, which is performed for a control of the inverters 31, 32 and the booster converter 33.

For the above configuration, an operation cycle (i.e., an calculation cycle) of the operation unit 47, the number of the multiplex communication lines 50, the number of data pieces contained in one communication frame, and a transmission speed of the communication frame, etc. are taken into consideration.

In the present embodiment, electric currents IU1, IV1, IU2, and IV2 detected by the current sensors 38U, 38V, 39U, and 39V are inputted to the communicator 45 via two channels, respectively, respectively, e.g. from IU11 main sensor and a IU1 sub-sensor collectively illustrated as current sensor 38U in FIG. 2. Further, while an electric current IL is inputted from the current sensor 40, the voltages VL and VH are inputted from the voltage sensors 41 and 42, respectively. Then, after receiving the above data, as eleven data pieces, the communicator 45 generates two communication frames for a control of the inverters 31, 32 and the booster convertor 33. For example, in one of the two communication frames, two channel's electric currents IU1, IV1, IU2, and IV2, i.e., 8 data pieces in total, are included. In the other communication frame, two channel's electric currents IU2 and IV2 and the electric current IL and the voltages VL and VH are contained, that is, 7 data pieces in total are included therein.

The first timer 46 measures a current time in the PCU 18. The first timer 46 has a counter, which is started by an input of a signal that is commonly input to both of the PCU 18 and the MGECU 22. In the present embodiment, as shown in FIG. 3, the input signal may be an ignition signal IG. Then, at a timing when the ignition signal IG indicates an ON state of an ignition switch (not illustrated), e.g., indicating a HI level, the first timer 46 is started up, i.e., starts to count. The first timer 46 may be implemented as an internal timer of the microcomputer, or implemented as a timer function of an IC.

The operation unit 47 controls the inverters 31, 32 and the booster converter 33. The operation unit 47 receives an input of the electric currents IU1, IV1, IU2, IV2, and IL, which are detected by the current sensors 38U, 38V, 39U, 39V, and 40, and also receives an input of the voltages VL and VH detected by the voltage sensors 41 and 42. Further, the operation unit 47 receives an input of the electric angles θ1 and θ2 detected by the rotation angle sensors 43 and 44.

Further, the operation unit 47 outputs control signals S31 and S32 for controlling the booster converter 33, while outputting control signals S11-S16, S21-S26 for controlling the inverters 31 and 32. For example, the transistor T11 is controlled by the control signal S11, and the transistor T21 is controlled by the control signal S21.

In the present embodiment, the operation unit 47 computes the electric current IW1 which flows into the W phase coil of the first MG 12 in view of the electric currents IU1 and IV1 detected by the current sensors 38U and 38V, based on a fact that the sum of the instantaneous values (=IW1, IU1 and IV1) of the electric currents which flow into the three phase coils equals to zero. Further, based on the electric currents IU2 and IV2 detected by the current sensors 39U and 39V, the electric current IW2 which flows into the W phase coil of the second MG 13 is computed. The electric currents IW1 and IW2 may also be detected by installing the other sensors for directly detecting those currents IW1 and IW2, i.e., by providing a current sensor on each of the three phases.

The operation unit 47 calculates a rate of charge (SOC) of the battery 19, i.e., a rate of the stored electricity against the full charge capacity of the battery 19, based on an integration value of the electric current IL. Further, based on the calculated SOC and the battery temperature detected by a temperature sensor, which is not illustrated, limit I/O values Win and Wout, which are the maximum permissible power for the charge and discharge of the battery 19, are calculated.

The operation unit 47 sets a torque instruction for each of the MGs 12 and 13, i.e., for controlling an output of the requested torque therefrom, to be within a range of two boundary values, i.e., the limit I/O values Win and Wout, of the battery 19. Then, based on each of the set-up torque instructions and the values detected by each of the sensors 38U, 38V, 39U, 39V, 40, 43, and 44, the control signals S11-S16, S21-S26 for the switching control of the inverters 31 and 32 are generated and output. In the present embodiment, the torque instruction is provided from the HVECU 20.

An example of a control for controlling the first MG 12 is described, for example. The operation unit 47 performs a three-phase to two-phase conversion for converting the three-phase current IU1, IV1, and IW1 to get a d-axis current and a q-axis current based on the electric current IU1, IV1, IW1 of each of three phases and the electric angle θ1. Further, based on the torque instruction, a d-axis electric current instruction and a q-axis electric current instruction are set. Then, based on (i) a difference between the converted d-axis electric current and the setting of the d-axis electric current instruction and (ii) a difference between the converted q-axis electric current and the setting of the q-axis electric current instruction, a feedback control (e.g., a PI control) is performed for setting a d-axis voltage instruction and a q-axis voltage instruction, respectively. Further, the settings of the d-axis voltage instruction and the q-axis voltage instruction are converted to get a phase voltage instruction for each of the three phases, by a two-phase to three-phase conversion. Then, for an application of the voltage to each of the three phases of the first MG 12 according to each of the three phase voltage instructions, the control signals S11-S16 for the switching control of the transistors T11-T16 are generated, and the generated signals S11-S16 are output to the inverter 31. The same control applies to the second MG 13.

Further, the operation unit 47 outputs the control signals S31 and S32 for the switching control of the booster converter 33, so that the after-boost voltage VH may approach a target voltage.

Specifically, based on each of the number of rotations of the MGs 12 and 13, which are computed from each of the torque instructions and each of the electric angles θ1 and θ2, the target voltages which should be applied to the inverters 31 and 32 are set. Then, a duty is set up by a feedback control so that the difference between the voltage VH and the target voltage is reduced.

Subsequently, the control signals S31 and S32 for the switching control of the transistors T31 and T32 of the booster converter 33 with an ON time rate according to the set-up duty are generated, and the generated signals S31, S32 are output to the booster converter 33.

The second timer 48 measures a current time in the MGECU 22. The second timer 48 also has a counter, which is started by an input of a signal that is commonly input to both of the PCU 18 and the MGECU 22. In the present embodiment, just like the first timer 46, the input signal may be an ignition signal IG. Then, when the ignition signal IG indicates an ON state of an ignition switch (not illustrated), the second timer 48 is started up, i.e., starts to count.

The time corrector 49 corrects a relative time difference between (i) time measured by the first timer 46 and (ii) time measured by the second timer 48. As described above, the ignition signal IG indicating the ON state is input to the PCU 18 and the MGECU 22, a power supply for the PCU 18 and the MGECU 22 is turned ON. However, a stabilization time, which may be required for stabilizing a clock signal generated in those components, is respectively different. Therefore, the first timer 46 and the second timer 49 start to count, i.e., start the time measurement, at respectively different timings. Therefore, time measured by the first counter 46 and time measured by the second counter 48 are different, i.e., a relative time difference are observed between the two time measurements. The time corrector 49 corrects such a time difference, with reference to an input of the ignition signal IG that indicates an ON state. Details of the correction are described later.

Among the communication lines connecting the PCU 18 and the MGECU 22, the multiplex communication line 50 is separately disposed from the other lines which transmit the control signals S11-S16, S21-S26, S31, and S32.

The multiplex communication line 50 connects the PCU 18 and the MGECU 22 so that the communication frame generated by the communicator 45 is transmitted to the operation unit 47. Since the communication frame contains plural data pieces as described above, plural data pieces are transmitted via the multiplex communication line 50, i.e., in a sharing manner sharing one communication line 50.

According to the present embodiment, the multiplex communication line 50 is used for a transmission of a response request signal generated by the time corrector 49 to the communicator 45. Further, the multiplex communication line 50 is also used for communication according to a CAN-FD (Controller Area Network Flexible Data Rate) protocol. Further, as the multiplex communication line 50, two lines are actually provided. That is, a first multiplex communication line 50a that transmits one of the above-mentioned two communication frames and a second multiplex communication line 50b that transmits the other frame are provided. Since these multiplex communication lines 50a and 50b are CAN bus lines, two communication paths are included in each of two lines 50a and 50b.

The communication line may be used for other type of communications, i.e., other protocols, such as FlexRay, Ethernet, besides the CAN-FD. CAN, FlexRay, and Ethernet are registered trademarks, respectively.

Figure 4:
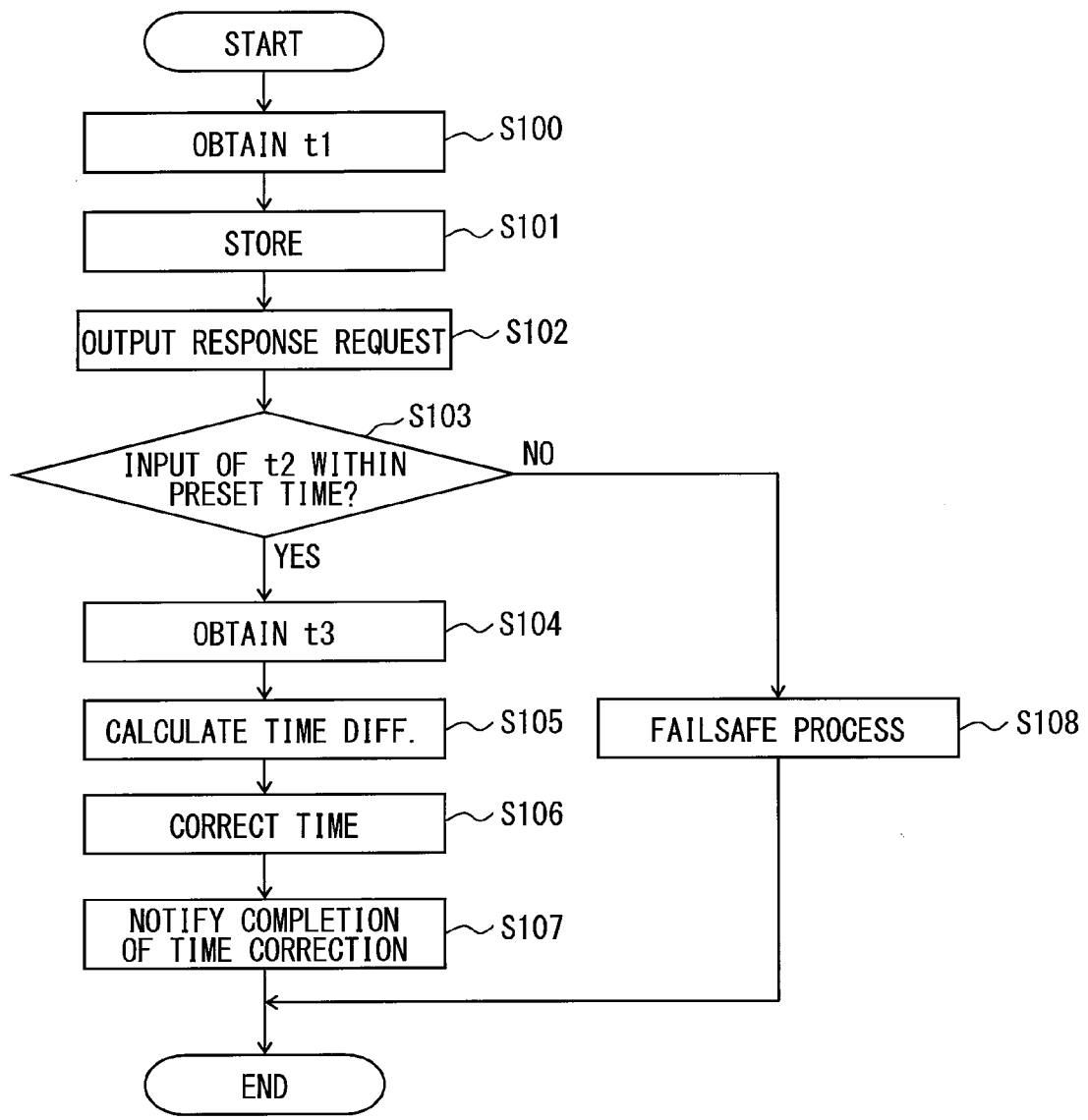
FIG. 4 is a flowchart of a time correction process performed by a time corrector of an MGECU of the present disclosure.
Figure 5:
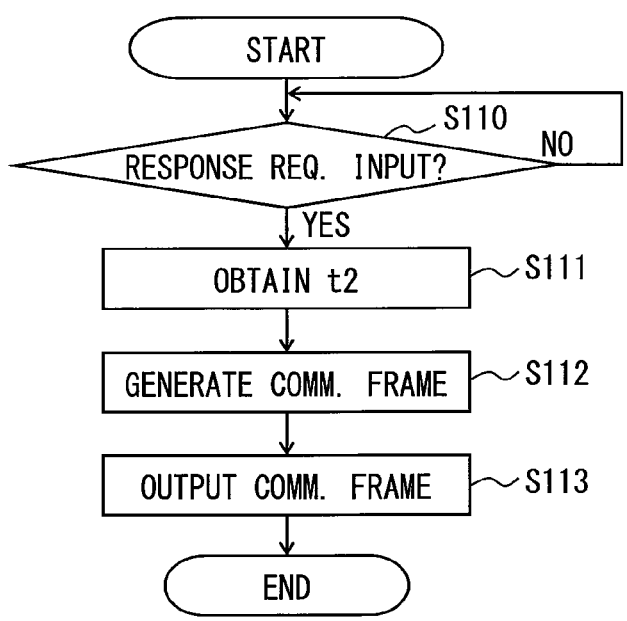
FIG. 5 is a flowchart of a response process performed by a PCU in response to a time correction of the present disclosure.

Based on FIGS. 4 and 5, a time correction process for correcting a relative time difference between the first and second timers 46, 48 is described.

FIG. 4 shows a process performed by the time corrector 49 of the MGECU 22. When the ignition signal IG turns to a high-level signal which indicates an ON state, a power supply for the MGECU 22 is switched ON. After a preset stabilization time, the operation unit 47, the second timer 48, and the time corrector 49 are started. After starting to operate, the time corrector 49 performs the time correction process shown below, before the operation unit 47 performs a preset process.

After starting, when a preset time passes (i.e., after a lapse of the preset time from an input of the ignition signal IG indicating an ON state), the time corrector 49 obtains time t1 which is the current time measured by the second timer 48 (Step S100). This time t1 corresponds to a first time in the claims.

The timing at which the second timer 48 measures the time t1, i.e., the obtainment timing at which the time corrector 49 obtains the time t1, is a preset timing with reference to the ignition signal IG.

The time corrector 49 stores the obtained time t1 in an internal memory of the microcomputer, for example (Step S101). Then, the time corrector 49 outputs, to the communicator 45, a response request signal after generating the response request signal via the multiplex communication line 50 at a timing of obtainment of the time t1 and storage thereof (Step S102).

In present embodiment, since two multiplex communication lines 50a and 50b are provided, the response request signal is transmitted via either one of the multiplex communication lines 50a and 50b.

Next, the time corrector 49 determines whether the communication frame including information on time t2 measured by the first timer 46 is input from the communicator 45 within a preset time from an output of the response request signal, i.e., within a preset time from obtaining the time t1. That is, it is determined whether the time t2 is inputted within the preset time (Step S103). The preset time described above may be a signal transmission time required for a round trip of the signal via the multiplex communication line 50 with a spare time of some amount, e.g., 100 μsec in this case.

In Step S103, if it is determined that the time t2 is input, the time corrector 49 immediately obtains time t3 which is a current time measured by the second timer 48 (Step S104). That is, the time corrector 49 obtains the time t3 along with an input of the time t2. The time t3 corresponds to a third time in the claims.

The timing of the measurement of the time t3 by the second timer 48, which is a timing of obtaining the time t3 by the time corrector 49, is (equal to) the timing of an input of the communication frame (to the time corrector 49).

The communication frame is output from the communicator 45 at the timing of obtaining the time t2, and the time t2 is obtained at the timing of an input of the response request signal (to the time corrector 49) as described later. Further, the response request signal is output at the timing of obtaining the time t1 by the time corrector 49, and the time t1 is obtained at a preset timing with reference to the ignition signal IG, as described above.

Therefore, in summary, the timing of obtaining the time t3 by the communicator 45 is legitimately described as a preset timing with reference to the ignition signal IG.

Next, the time corrector 49 computes the relative time difference (i.e., time error) between the time measured by the first timer 46 of the PCU 18 and the time measured by the second timer 48 of the MGECU 22, by reading the time stored in the memory and based on the times t1, t2, t3 obtained so far (Step S105).

If there is no relative time difference observed among those times, an in-between time at a "center" of the time t1 and the time t3 matches the time t2. In Step S105, the time corrector 49 performs an operation shown in a following equation.

$$\text{Relative time difference} = t2 - \{t1 + (t3 - t1)/2\} \quad \text{(Equation 1)}$$

The multiplex communication line 50 connects the PCU 18 and GECU 22 in a one-to-one manner, and, when the time correction process is performed, the multiplex communication line 50 transmits the response request signal and the corresponding communication frame, which is output in response to the response request signal.

Therefore, if the stabilization time after an input of the ignition signal IG has a time error of 5 μsec, a count start timing as well as the time t2 and t1+(t3−t1)/2 also have the relative time difference of about 5 μsec.

Next, the time corrector 49 corrects the relative time difference between the first timer 46 and the second timer 48 based on the relative difference computed at S105 (Step S106).

In such time correction process, the time of the second timer 48 may be corrected to the time of the first timer 46, or the time of the first timer 46 may be corrected to the time of the second timer 48. In the present embodiment, the time of the second timer 48 is corrected to the time of the first timer 46.

Since the second timer 48 is possessed by the MGECU 22 together with the time corrector 49, there is no need to transmit correction data via the multiplex communication line 50. Therefore, the correction can be performed in a short time.

After performing S106, the time corrector 49 generates a notification signal that notifies a completion of the correction, and outputs the generated notification signal to the communicator 45 via the multiplex communication line 50 (Step S107). A series of processing is performed in the above-described manner.

On the other hand, at S103, if it is determined that the time t2 is not input within the preset time, the time corrector 49 performs a failsafe process (Step S108). Then, a series of processing is finished. As the failsafe process, a control of the MGs 12 and 13 by the MGECU 22 (i.e., by the operation unit 47) is prohibited, for example. Further, a failsafe signal is output to the HVECU 20 and, in response, the HVECU 20 switches to an engine-only travel mode that only uses the engine 11 for a travel of the vehicle 10, for example.

FIG. 5 is a response process performed by the communicator 45 in response to a process of the time corrector 49.

The communicator 45 determines first whether the response request signal is input from the time corrector 49 (Step S110). If it is determined that the signal is input at S110, the communicator 45 immediately obtains the time t2 measured by the first timer 46, which is a current time (Step S111). The time t2 corresponds to a second time in the claims.

The timing of measurement of the time t2 by the first timer 46, i.e., the timing of obtaining the time t2 by the communicator 45, is a timing of an input of the response request signal. The response request signal is output by the time corrector 49 at the timing of obtaining the time t1, and the time t1 is obtained at a preset timing with reference to the ignition signal IG, as described above. Therefore, the timing of obtaining the time t2 by the communicator 45 is legitimately described as the preset timing with reference to the ignition signal IG.

Then, the communicator 45 generates a communication frame that includes the information about the obtained time t2 (Step S112), and outputs the generated frame to the time corrector 49 via the multiplex communication line 50 (Step S113). After the completion of the output of the communication frame, a series of processing is finished.

Figure 6:
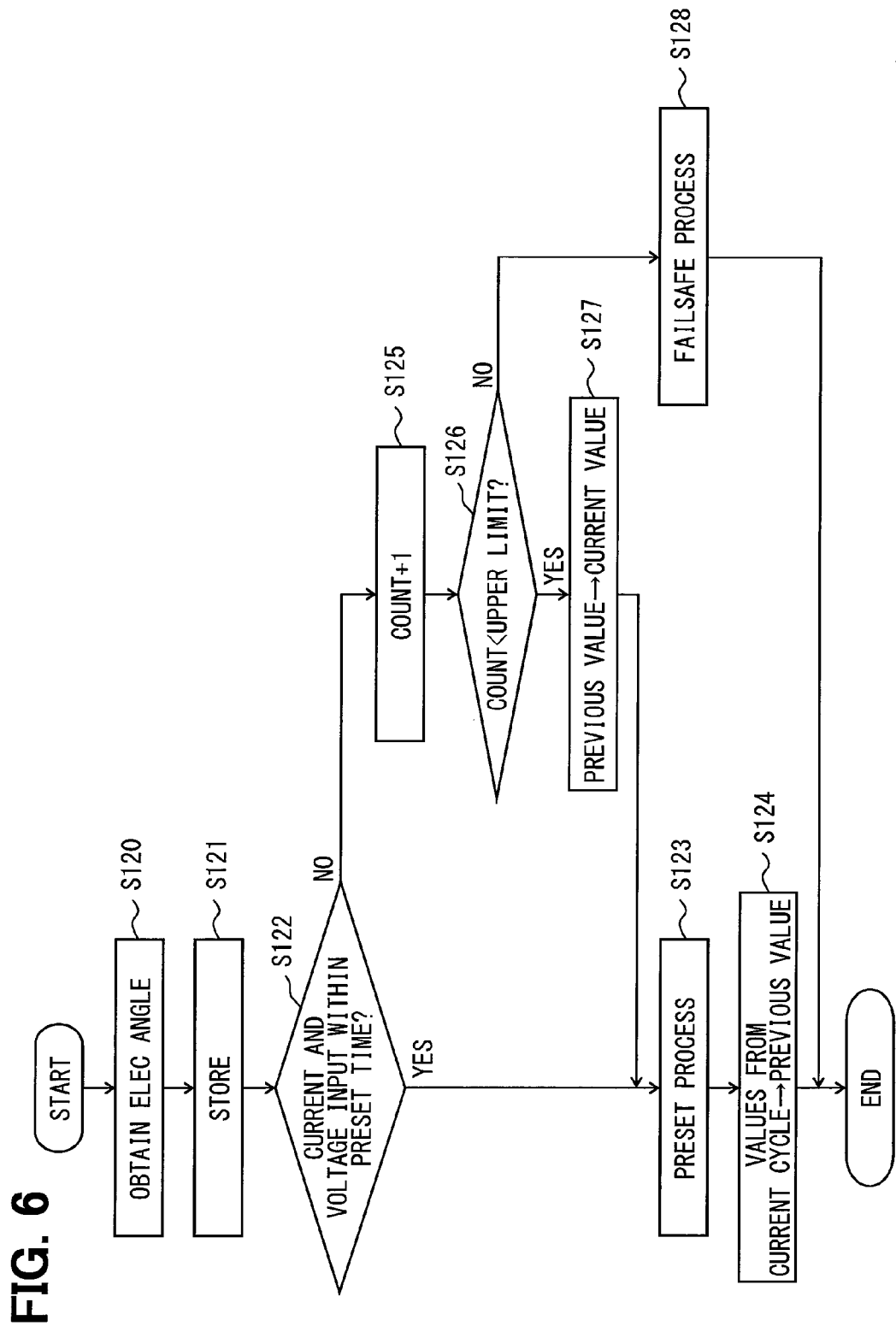
FIG. 6 is a flowchart of a process performed by an operation unit of the MGECU for a control of an inverter and a booster converter of the present disclosure.
Figure 7:
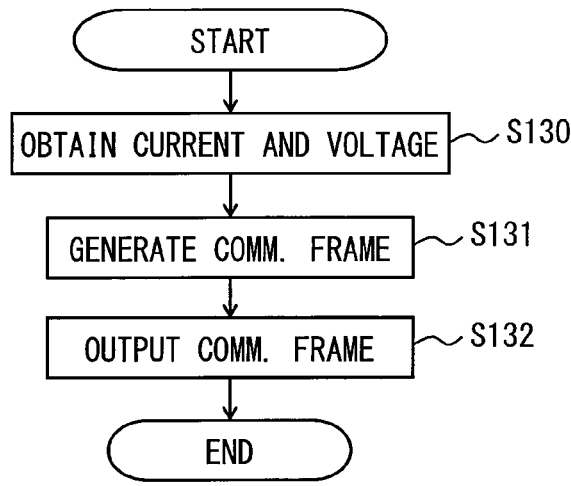
FIG. 7 is a flowchart of a process performed by a communicator of the PCU for a control of the inverter and the booster converter of the present disclosure.

Next, based on flowcharts shown in FIGS. 6 and 7, a control method of the MG control system 30 for controlling the inverters 31 and 32 and the booster converter 33 is described.

FIG. 6 illustrates a process performed by the operation unit 47 of the MGECU 22. The operation unit 47 performs the following process after the end of the time correction process. Further, while the power supply is switched ON, the process is repeatedly performed.

The operation unit 47 obtains the electric angles θ1 and θ2 detected by the rotation angle sensors 43 and 44 (Step S120). The communication line used for the transmission of the electric angles θ1 and θ2 is different from the multiplex communication line 50 described above, and the electric angles θ1 and 02 are directly input from the rotation angle sensors 43 and 44 to the operation unit 47 of the MGECU 22. Then, the operation unit 47 stores the obtained data in the internal memory of the microcomputer, for example (Step S121).

After the end of the time correction process, the operation unit 47 performs a first obtainment of the electric angles θ1 and θ2 after the time correction, when the time measured by the second timer 48 reaches a preset time. Thereafter, the operation unit 47 obtains the angles θ1 and θ2 at the same operation cycle of the preset process for the control of the inverters 31, 32 and the booster converter 33.

In addition, the operation unit 47 obtains the electric angles θ1 and θ2 at a prior timing, prior to performing the preset process described above by a preset time. For example, when the preset process has an operation cycle of 100 μsec, the electric angles θ1 and θ2 may be obtained 60 μsec before performing the preset process.

Then, the operation unit 47 determines whether the communication frame is input within the preset time from obtaining the electric angles θ1 and θ2. That is, it is determined whether the electric currents IU1, IV1, IU2, and IV2 from the two channels as well as the electric current IL and the voltages VL and VH are input within the preset time (Step S122). In the present embodiment, it is determined whether an input of the electric currents and the voltages is performed within 50 μsec after obtaining the electric angles θ1 and θ2, for example.

In Step S122, if it is determined that the electric currents and the voltages are input, the operation unit 47 performs the preset process for a control of the inverters 31 and 32 and the booster converter 33 (Step S123). In such preset process, the electric angles θ1 and θ2 stored in S122 and the electric currents IU1, IV1, IU2, and IV2 in the inputted communication frames from two channels, as well as the electric current IL and the voltages VL and VH are used for the calculation of the preset process.

Subsequently, the operation unit 47 stores the values used in the current Step S123 for the preset process to the memory as previous values (Step S124). That is, the values from the current cycle of the preset process is stored for the later use as the previous value, i.e., the electric currents IU1, IV1, IU2, IV2, IL and the voltages VL and VH, plus the electric angles θ1, θ2.

Then, a series of processing is finished.

In Step S122, on the other hand, if it is determined that at least one of the electric current or the voltage is not input, the operation unit 47 counts up an internal counter by 1 (Step S125), and determines whether the count reaches an upper limit of preset value (Step S126).

In Step S126, if it is determined that the count is less than the upper limit, the operation unit 47 reads the previous value in the memory, and sets them as the current values, i.e., the values used in the current cycle of the preset process (Step S127). Then, steps after S123 are performed.

In the present embodiment, every time the power supply for the MGECU 22 is switched ON, the previous value is set to a certain preset value.

In Step S126, if it is determined that the count is equal to or greater than the upper limit, the operation unit 47 performs a failsafe process (Step S128). Then, a series of processing is finished.

As the failsafe process, the control of the MGs 12 and 13 may be prohibited, for example. Alternatively, in the failsafe process, the operation unit 47 may output a failsafe signal to the HVECU 20, and, in response, the HVECU 20 may switch a travel mode of the vehicle 10 to an engine-only mode, i.e., drawing the travel power only from the engine 11.

FIG. 7 shows a process in the PCU 18. The communicator 45 of the PCU 18 performs the following process, when a power supply thereto is switched ON. Further, while the power supply is switched ON, the process is repeatedly performed.

The communicator 45 obtains the detection values from the current sensors 38U, 38V, 39U, 39V, and 40 and the voltage sensors 41 and 42 (Step S130). More practically, the electric currents IU1, IV1, IU2, and IV2 from two channels and the electric current IL and the voltages VL and VH are respectively obtained. Then, the above-described two communication frames are generated which includes the obtained values.

Then, the communicator 45 obtains the electric currents IU1, IV1, IU2, and IV2 and the electric current IL and the voltages VL and VH for the first time after the end of the time correction process. The time of obtaining the values for the first time is the same as the time of obtaining the electric angles θ1 and θ2 for the first time by the operation unit 47 which is performed in S120. Further, the electric currents IU1, IV1, IU2, and IV2 as well as the electric current IL and the voltages VL and VH are obtained thereafter at the same cycle as the obtaining of the electric angles θ1 and θ2. Due to the time correction which matches the time measured by the first timer 46 and the time measured by the second timer 48, the communicator 45 and the operation unit 47 can respectively obtain the electric currents IU1, IV1, IU2, and IV2 as well as the electric current IL and the voltages VL and VH in addition to the electric angles θ1 and θ2 that are detected at the same timing, based on the times of the timers 46, 48.

Then, the communicator 45 outputs each of the generated communication frames to the operation unit 47 via corresponding multiplex communication line 50 (50a, 50b) (Step S132). The two communication frames are output to the operation unit 47 almost simultaneously. Then, after completion of the output of the communication frames, a series of processing is finished.

Figure 8:
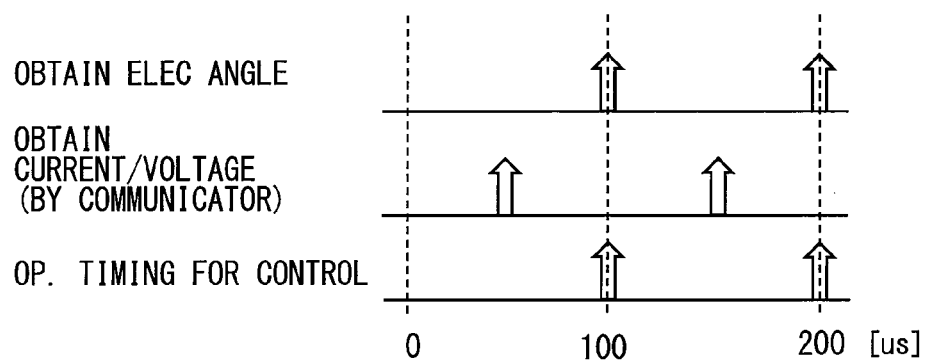
FIG. 8 is a time chart of an operational effect of the MG control system of a reference example.
Figure 9:
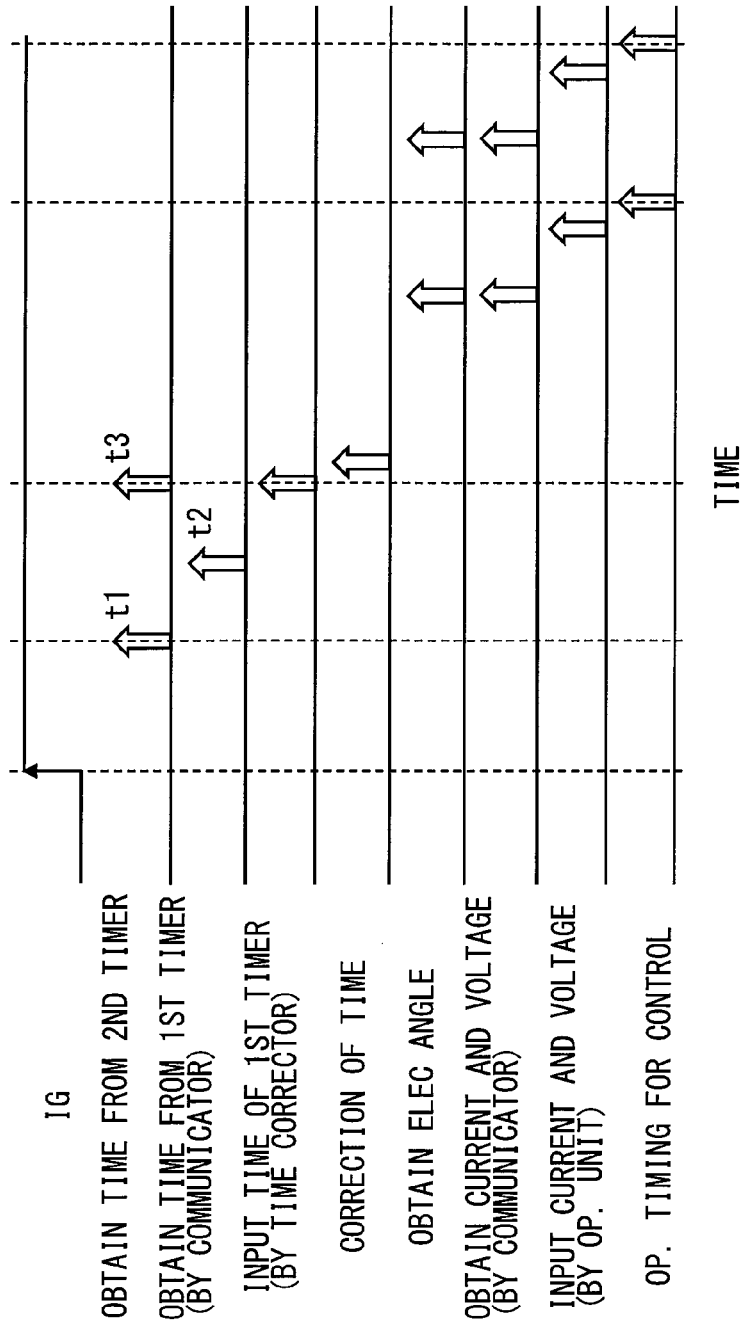
FIG. 9 is a time chart of an operational effect of the MG control system of the present disclosure.

Next, the operation effects of the MG control system 30 are described based on FIGS. 8 and 9.

According to the present embodiment, the PCU 18 has the communicator 45, and the communicator 45 generates the communication frame containing the plurality of the values detected by the current sensors 38U, 38V, 39U, 39V, 40 and the voltage sensors 41 and 42. The generated communication frame is transmitted to the operation unit 47 of the MGECU 22 via the multiplex communication line 50.

In the present embodiment, the electric currents IU1, IV1, IU2, and IV2 from two channels, and the electric current IL, and the voltages VL and VH, i.e., a total of 11 data pieces, are divided into two communication frames. As such, the plural data pieces are transmitted to the operation unit 47 via the common multiplex communication line 50, the number of the communication lines connecting the PCU 18 and the operation unit 47 is reduced, in comparison to a conventional configuration in which the plural data pieces are transmitted via respectively different communication lines. More specifically, 11 analog communication lines are reduced to four lines, i.e., to two pairs of two multiplex communication lines 50a, 50b (50).

Therefore, across the dividing wall between the vehicle compartment and the engine room through a small hole, the operation unit 47 on the vehicle compartment side and the PCU 18 on the engine room side are connected with the multiplex communication line 50, i.e., with a fewer number of communication lines.

When the multiplex communication line is used for communication between the ECUS, the multiplex communication line causes a communication delay, which is hardly caused by an analog communication line. Therefore, in a reference example which is provided with the multiplex communication line and which does not perform time correction by utilizing a common input to each of many sensors, although the number of communication lines is reduced, communication delay inevitably poses a problem.

The detection signal of the rotation angle sensor is an analog input, and hardly causes communication delay. Therefore, as shown in FIG. 8, an operation timing of the operation unit 47 for the control of the inverters 31, 32 and the booster converter 33 substantially matches an obtainment timing of the electric angles. On the other hand, since a communication delay is caused for (the detection signals of) the electric current and the voltage which are input to the operation unit 47 via the multiplex communication line 50, the obtainment timing for obtaining the electric currents and the voltages is set to an earlier timing that is earlier than the operation timing by a preset time amount. That is, the obtainment timing of the electric angles and the obtainment timing of the electric current and the voltage do not match. If such a problem is left unattended, the values, i.e., the electric current values, the voltage values, and the electric angle values, from unmatching/different obtainment timings cause a deteriorated controllability in the control of the inverters and the booster converter.

In view of the above, the MGECU 22 of the present embodiment has the time corrector 49. The time corrector 49 obtains, as shown in FIG. 9, times t1, t2, t3 from the first and second timers 46, 48 with reference to the ignition signal IG, i.e., at a preset timing. Then, based on the times t1, t2, t3, the time corrector 49 calculates the relative time difference and perform the time correction. Therefore, the obtainment timing for obtaining the electric angles θ1 and θ2 by the operation unit 47 and the obtainment timing for obtaining the electric currents IU1, IV1, IU2, IV2, IL, and the voltages VL, VH by the communicator 45 substantially match with each other. That is, the operation unit 47 is enabled to perform the preset operation based on the electric currents IU1, IV1, IU2, IV2, IL, and the voltages VL, VH and electric angles θ1 and θ2, all of which are detected at the same timing, i.e., synchronize. Thus, a deterioration of the controllability in the control of the inverters 31, 32 and the booster converter 33 is prevented.

Further, a two communication frames generation scheme in the present embodiment may be changed/modified to other schemes. That is, the number of communication frames is not necessarily limited to two. Depending on the number of data pieces received by the communicator 45 and the transmission cycle, the communicator 45 may generate only one communication frame, or may generate three or more frames. For example, the first communication frame may contain the electric currents IU1 and IV1 from two channels, and the second communication frame may contain the electric currents IU2 and IV2 from two channels, and the third communication frame may contain the electric current IL and the voltages VL, VH.

The number of multiplex communication line 50 is not necessarily limited to two, either. For example, one multiplex communication line 50 may be configured to serially transmit plural communication frames. According to the above, 11 analog communication lines are reduced to only two lines, i.e., to two multiplex communication lines 50 (i.e., two CAN buses), for example. That is, the number of communication lines is reduced further.

Further, as an example of a timer in the claims, the timers 46, 48 are illustrated, operation of which are started by an input of the ignition signal IG. However, a timer may be a real-time clock which receives a power supply for all the time. When a real-time clock is used as a timer, the relative time difference due to respectively different stabilization times after a start of the power supply to the timers 46, 48, will not be caused. However, even when the power supply is ON for all the time, a first timer and a second timer still need to have the time correction relative to each other as the time lapses after a long operation time. In view of the above consideration, the time correction between two real-time clocks may also be performed with reference to an input of the ignition signal IG, for the reduction of the relative time difference of two real-time clocks.

Second Embodiment

In the present embodiment, the common part with the preceding embodiment will not be repeated in the description, and only the difference therefrom is described for the MG control system 30.

Figure 10:
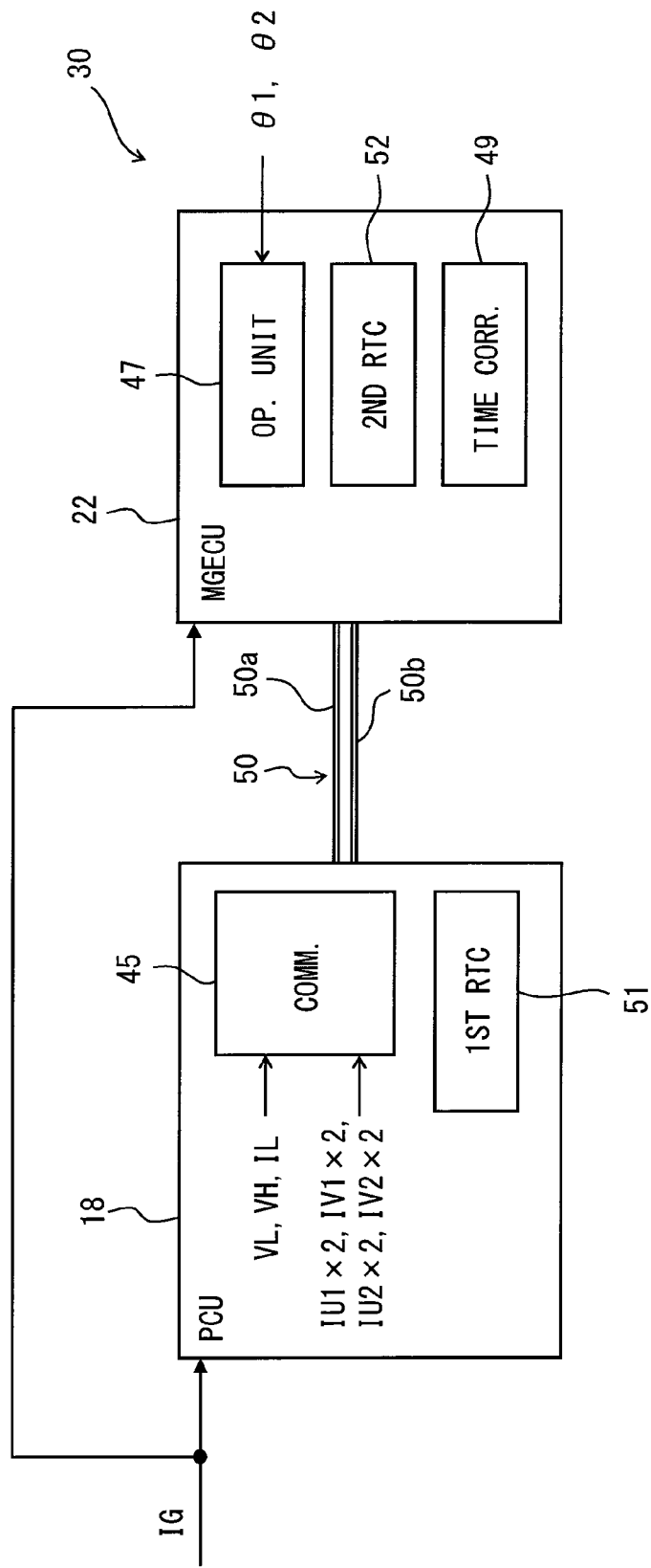
FIG. 10 is a block diagram of the MG control system of the present disclosure.

According to the present embodiment, as shown in FIG. 10, the PCU 18 includes, as a first timer, a first real-time clock 51 (i.e., a first RTC 51, hereafter) and the MGECU 22 includes, as a second timer, a second real-time clock 52 (i.e., a second RTC 52, hereafter). Each of the two real-time clocks 51, 52 always receives a power supply, for measuring time.

The time correction process for correcting the relative time difference between the real-time clocks 51, 52 is described with reference to flowcharts in FIGS. 11 and 12.

Figure 11:
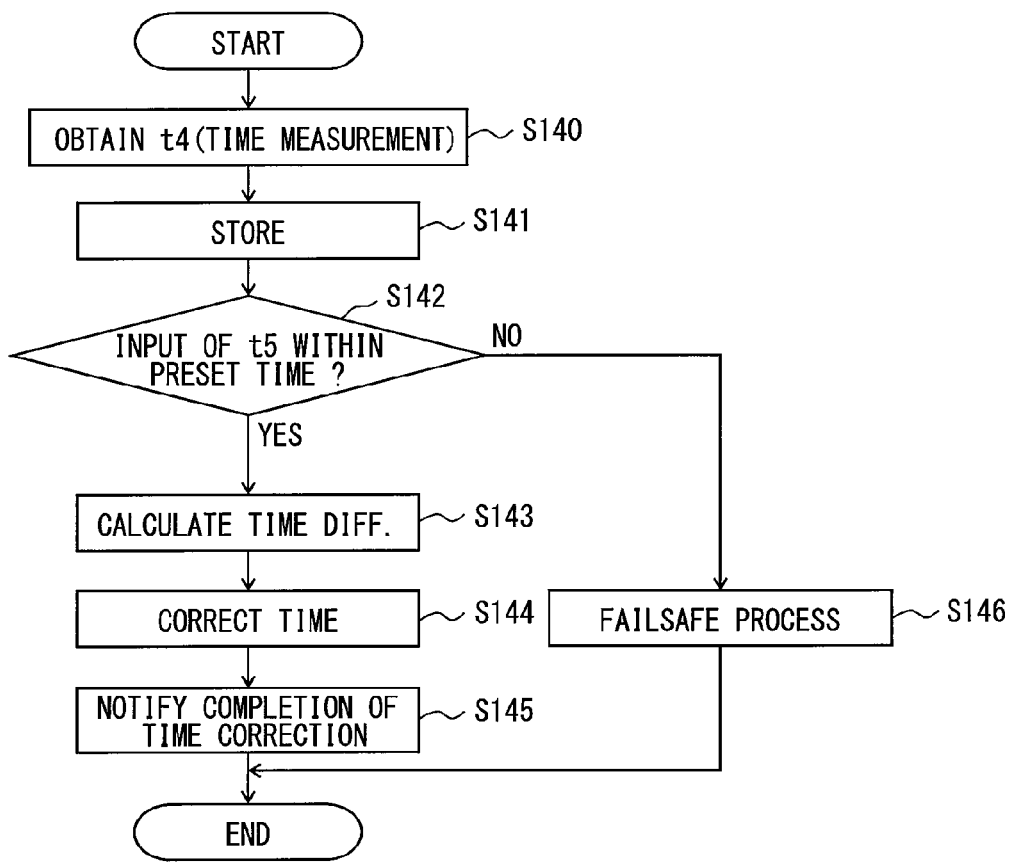
FIG. 11 is a flowchart of a time correction process performed by a time corrector of the MGECU of the present disclosure.

FIG. 11 illustrates a process in the time corrector 49. When the ignition signal IG shows a high-level signal, indicating an ON state, the power supply for the MGECU 22 is turned ON. After a preset stabilization time from such turning ON of the MGECU 22, the operation unit 47 and the time corrector 49 are respectively started. The timer corrector 49 performs the following process after a start of its operation. That is, before the operation unit 47 in the MGECU 22 performs the preset process, the time corrector 49 performs the time correction process.

After a preset time of starting, i.e., after the lapse of a preset amount of time from an input of the ignition signal IG indicating an ON state, the time corrector 49 obtains time t4 which is measured by the second RTC 52 as a current time (Step S140). The time t4 corresponds to a fourth time in the claims. Further, the obtained time t4 is stored in an internal memory of the microcomputer (Step S141). The timing of measuring the time t4 by the second RTC 52, i.e., the timing of obtaining the time t4 by the time corrector 49, is a preset timing with reference to the ignition signal IG.

Then, within a preset time from obtaining the time t4, the time corrector 49 determines whether a communication frame is input from the communicator 45, which includes information about time t5 measured by the first RTC 51. In other words, whether the time t5 is input within a preset time is determined (Step S142). The preset time in this case means 50 µsec, for example, which is a sum total of a transmission time of the communication frame and a certain allowance time.

In Step S142, if the input of the time t5 is determined, the time corrector 49 reads the stored time t4 from the memory, and calculates the relative time difference between the first RTC 51 in the PCU 18 and the second RTC 52 in the MGECU 22, i.e., the time difference—or error—among the measurements of the two RTC. If no relative time difference is caused, the time t4 matches the time t5.

Next, based on the relative time difference calculated in Step S143, the time corrector 49 performs the time correction process for the times measured by the first and second RTCS 51, 52 (Step S144). The time correction process may correct the time of the second RTC 52 to the time of the first RTC 51, or may correct the time of the first RTC 51 to the time of the second RTC 52. In the present embodiment, the time of the second RTC 52 is corrected to the time of the first RTC 51, in the same manner as the first embodiment.

After Step S144, the time corrector 49 generates a notification signal that notifies a completion of the correction, and outputs the generated notification signal to the communicator 45 via the multiplex communication line 50 (Step S145). A series of processing is performed in the above-described manner.

On the other hand, in S142, if it is determined that the time t5 is not input within the preset time, the time corrector 49 performs a failsafe process (Step S146). Then, a series of processing is finished. As the failsafe process, a control of the MGs 12 and 13 by the MGECU 22 (i.e., by the operation unit 47) is prohibited, for example. Further, a failsafe signal is output to the HVECU 20 and, in response, the HVECU 20 switches to an engine-only travel mode that draws a travel power for a travel of the vehicle 10 only from the engine 11, for example.

Figure 12:
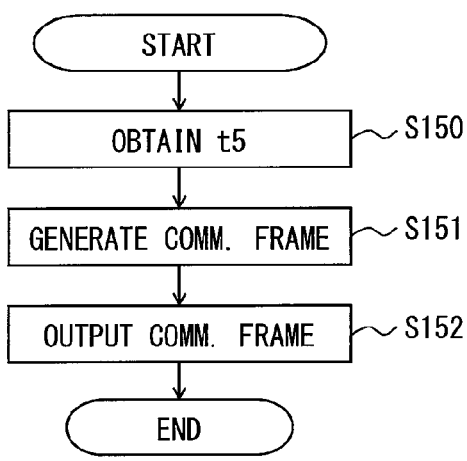
FIG. 12 is a flowchart of a response process performed by the PCU in response to a time correction of the present disclosure.

FIG. 12 illustrates a process performed by the communicator 45. After a preset time from starting, i.e., after the lapse of preset time amount from an input of the ignition signal IG indicating an ON state, the communicator 45 obtains the time t5, i.e., the current time measured by the first RTC 51 (Step S150). The time t5 corresponds to a fifth time in the claims. The timing of measurement of the time t5 by the first RTC 51 is the same as the timing of the measurement of the time t4 by the second RTC 52, respectively with reference to the ignition signal IG indicating an ON state.

Then, the communicator 45 generates a communication frame that includes the information about the time t5, and outputs the generated frame to the time corrector 49 via the multiplex communication line 50 (Step S152). Then, after completion of the output of the communication frame, a series of processing is finished.

The control method of the MG controller 30 for controlling the inverters 31, 32, and the booster converter 33 is the same as the first embodiment. Therefore, the details of such control will not be repeated in the second embodiment.

The effects of the MG controller 30 in the present embodiment are described in the following.

The number of communication lines for connecting the PCU 18 and the MGECU 22 is reduced by the above-described scheme in the present embodiment. More practically, 11 analog communication lines are reduced to four lines, i.e., to two pairs of multiplex communication lines 50a, 50b (50).

Further, since the RTCS 51, 52 serving as timers are used, there is no need to output a response request signal from the time corrector 49 to the communicator 45 as described in the first embodiment. As shown in FIG. 13, with reference to the ignition signal IG indicating an ON state, the time t4 and the time t5 are obtained at the same timing. When the time of the first RTC 51 and the time of the second RTC 52 are different relative to each other, the time t4 and the time t5 are respectively different, i.e., a relative time difference is observed therebetween. Therefore, by correcting the relative time difference, the timing of obtaining the electric angles θ1 and θ2 by the operation unit 47 and the timing of obtaining the electric currents IU1, IV1, IU2, IV2, IL and the voltages VL, VH are synchronized. The operation unit 47 is thus enabled to perform the preset operation based on the same-time-obtained detection values, i.e., the electric currents IU1, IV1, IU2, IV2, IL and the voltages VL, VH as well as the electric angles θ1 and θ2. As a result, the deterioration of the controllability in the control of the inverters 31, 32 and the booster converter 33 is prevented.

A two communication frames generation scheme, i.e., the communicator 45 generating two communication frames, in the present embodiment may be changed and modified to other schemes. That is, the number of communication frames is not necessarily limited to two. Further, the number of multiplex communication line 50 is not necessarily limited to two, either.

Although the present disclosure has been fully described in connection with the preferred embodiment thereof with reference to the accompanying drawings, it is to be noted that various changes and modifications will become apparent to those skilled in the art.

For example, the application of the MG control system 30 is not necessarily limited to the split-type hybrid vehicle 10. Therefore, the number of the MGs is also not limited to two, which has been described above as two MGs 12 and 13, i.e., two rotating electric machines.

The PCU 18 in the above is shown as having two inverters 31 and 32 and the booster converters 33, which are respectively serving as a power convertor in the claims. However, the power convertor is only required to have an inverter at least, and the number of the inverters is not necessarily limited. For example, there may be only one pair of an MG and an inverter for driving the MG, or three or more pairs of the MG and the inverter.

A part of the functions of the MGECU 22 may be provided by the PCU 18. For example, a PWM modulator, which is not illustrated, for generating the control signals S11-S16, S21-S26 may be provided by the PCU 18, instead of providing it from the MGECU 22. In such a case, the PWM modulator is disposed on a controller board together with the communicator 45 and other components.

Although the HVECU 20, the engine ECU 21, the operation unit 47, and the battery ECU 23 are described as separate components in the above, those ECUS 20-23 may be united as one ECU. For example, the HVECU 20 and the MGECU 22 may be united as one ECU. Also, the HVECU 20, the MGECU 22, and the battery ECU 23 may be united as one ECU. Further, all the ECUS 20-23 may be united as one ECU.

The signal commonly input to both of the PCU 18 and the MGECU 22 is not necessarily limited to the ignition signal IG. Beside the ignition signal IG, a start signal for starting a hybrid system may also be used as a replacement, for the hybrid vehicle 10. The start signal may be input upon having a driver's operation for pushing a power switch on an instrument panel of the vehicle. When the vehicle is an electric vehicle, the start signal for starting the electronic system of the vehicle may be used as the above-described signal.

By using a time stamp, the operation unit 47 may be enabled to perform the preset operation, based on the same-time-detected values, i.e., the electric currents IU1, IV1, IU2, IV2, IL and the voltages VL and VH, as well as the electric angles θ1, θ2, for the control of the inverters 31 and 32 and booster converter 33.

A time stamp is the information added to the detected sensor value for a proof of the detection time.

The operation unit 47 obtains an electric angle obtain time either from the second timer 48 or from the second RTC 52 while obtaining the electric angles θ1, θ2 from the rotation angle detector 44, 44, and the electric angles θ1, θ2 are stored in the memory together with the electric angle obtain time.

On the other hand, the communicator 45 a current/voltage obtain time either from the first timer 46 or from the first RTC 51 while obtaining at the preset cycle the electric currents IU1, IV1, IU2, IV2, IL and the voltages VL and VH from the current sensors 38U, 38V, 39U, 39V, and 40, and voltage sensors 41 and 42, and generates a communication frame. That is, the current/voltage obtain time is also included in the communication frame. Then, via the multiplex communication line 50, the communication frame is input to the operation unit 47, the operation unit 47 reads the electric angles θ1, θ2 from the memory, to which the substantially-same obtain time is assigned as the time stamp in the communication frame. Then, the preset process is performed based on the those values, i.e., the electric currents IU1, IV1, IU2, IV2, IL and the voltages VL and VH included in the communication frame and the electric angles θ1, θ2 retrieved from the memory.

Such changes, modifications, and summarized schemes are to be understood as being within the scope of the present disclosure as defined by appended claims.

What is claimed is:

1. A rotating electric machine control system disposed in a vehicle and controlling rotating electric machines, at least one rotating electric machine used as a power source for a travel of the vehicle, the system comprising:
a power control unit including
a voltage converter converting a direct current voltage from a direct current power source and outputting a converted three-phase alternating current to the at least one rotating electric machine,
a current detector detecting an electric current, as a detected current value, that is output from the voltage converter to the at least one rotating electric machine in each of three phases,
a voltage detector detecting the direct current voltage, as a detected voltage value,
a communicator generating and outputting a communication frame, and
a first timer and a second timer each measuring time;
a controller having an operation unit that performs a preset operation for a control of the voltage converter to output the converted three-phase alternating current to the at least one rotating electric machine which outputs a requested torque from the at least one rotating electric machine, and a time corrector correcting a relative time difference between time measured by the second timer and time measured by the first timer;
a multiplex communication line communicably connecting the power control unit and the controller, the communication frame being transmitted from the communicator to the controller; and
a rotation detector detecting a rotation position of the at least one rotating electric machine and outputting the rotation position to the controller via a line other than the multiplex communication line, wherein
(i) the time corrector performs a time correction which corrects the relative time difference between the first timer and the second timer by obtaining time measurements from the first and second timers at a preset timing, with reference to an input signal that is commonly input to both of the power control unit and the controller,
(ii) after the time correction by the time corrector, the operation unit obtains at a preset cycle the rotation position that is detected by the rotation detector, and, when the operation unit is obtaining the rotation position, the communicator obtains a plurality of detected current values from the current detector and a plurality of detected voltage values from the voltage detector to generate the communication frame, and outputs the communication frame to the operation unit via the multiplex communication line, and
(iii) the operation unit performs the preset operation based on the rotation position, the detected current value, and the detected voltage value, wherein
the rotation position, the detected current value, and the detected voltage value are detected substantially simultaneously.

2. The rotating electric machine control system of claim 1, wherein
the time corrector obtains a first time measured by the second timer after a lapse of a preset time with reference to the input signal, and outputs a response request signal to the communicator via the multiplex communication line,
the communicator generates the communication frame including a second time measured by the first timer, and outputs the communication frame to the time corrector via the multiplex communication line upon receiving an input of the response request signal, and
the time corrector obtains a third time measured by the second timer upon receiving an input of the second time, and corrects the relative time difference between the time measured by the first timer and the time measured by the second timer based on the first time, the second time, and the third time.

3. The rotating electric machine control system of claim 2, wherein time measurement operation of each of the first timer and the second timer is started by the input signal that is commonly input to both the first and second timers.

4. The rotating electric machine control system of claim 1, wherein the first timer and the second timer receive a power supply regardless of inputting of the input signal, after a lapse of a preset time with reference to the input signal, the communicator generates the communication frame including a fourth time measured by the first timer, and outputs the communication frame to the time corrector via the multiplex communication line, the time corrector obtains a fifth time measured by the second timer, and the time corrector corrects the relative time difference between the time measured by the first timer and the time measured by the second timer based on the fourth time and the fifth time.

5. The rotating electric machine control system in claim 1, wherein the power source for the travel of the vehicle includes an internal combustion engine, and an ignition signal of the vehicle that is inputted to both the power control unit and the controller serves as the input signal.

6. The rotating electric machine control system in claim 1, wherein a start signal for starting an electronic system of the vehicle that is inputted to the power control unit and the controller serves as the input signal.

* * * * *